(12) United States Patent
Moreau

(10) Patent No.: US 6,766,350 B1
(45) Date of Patent: Jul. 20, 2004

(54) SHARED MANAGEMENT OF DATA OBJECTS IN A COMMUNICATION NETWORK

(75) Inventor: Jean-Jacques Moreau, Rennes (FR)

(73) Assignee: Canon Research Centre France S.A., Cesson-Sevigne (FR)

( * ) Notice: Subject to any disclaimer, the term of this patent is extended or adjusted under 35 U.S.C. 154(b) by 825 days.

(21) Appl. No.: 09/598,199

(22) Filed: Jun. 21, 2000

(30) Foreign Application Priority Data

Jun. 25, 1999 (FR) .............................................. 99 08156
Jun. 25, 1999 (FR) .............................................. 99 08155

(51) Int. Cl.$^7$ .............................................. G06F 15/16
(52) U.S. Cl. ...................... 709/200; 709/230; 719/330; 719/316
(58) Field of Search ............................... 719/310–320, 719/330; 709/200–203, 230

(56) References Cited

U.S. PATENT DOCUMENTS

| | | | | |
|---|---|---|---|---|
| 5,577,251 A | * | 11/1996 | Hamilton et al. | 718/101 |
| 6,044,409 A | * | 3/2000 | Lim et al. | 719/315 |
| 6,157,961 A | * | 12/2000 | Kessler et al. | 719/315 |
| 6,175,864 B1 | * | 1/2001 | Addison et al. | 709/219 |
| 6,189,048 B1 | * | 2/2001 | Lim et al. | 719/330 |
| 6,249,803 B1 | * | 6/2001 | Jindal et al. | 709/203 |
| 6,253,256 B1 | * | 6/2001 | Wollrath et al. | 719/330 |
| 6,260,078 B1 | * | 7/2001 | Fowlow | 719/332 |
| 6,272,557 B1 | * | 8/2001 | Lim et al. | 719/315 |

OTHER PUBLICATIONS

Simeon Simeonov, "WDDX: Distributed Data for the Web," Dec. 7, 1998, XP002135918, retrieved from <URL:http://www.wdx.org>.

Jeremy Allaire, "The Emerging Distributed Web, Part 3/4 and 4/4," Sep. 1998, XP002135919, retrieved from <URL:http://www.wdx.org>.

Reza Nekovei, "Data Interoperability via Surrogate API Libraries," Proceedings International Symposium on Software Engineering for Parallel and Distributed Systems, Los Angeles, CA, USA, May 17–18, 1999, pp. 190–96, XP002135920.

Eckhard Moeller et al., "The Berkom mutimedia–mail teleservice," Computer Communications, NL, Elsevier Science Publishers BV, Amsterdam, vol. 18, No. 2, Feb. 1, 1995, pp. 89–102, XP004032505.

James A. Storer, "A Parallel Architecture for High Speed Data Compression," Proceedings of the Symposium of Massively Parallel Computation, US, Los Alimitos, IEEE Comp. Soc. Press, vol. Symp. 3, 1990, pp. 238–43, XP000268914.

* cited by examiner

Primary Examiner—St. John Courtenay, III
(74) Attorney, Agent, or Firm—Fitzpatrick, Cella, Harper & Scinto

(57) ABSTRACT

A method of marshalling on a computer communication network makes it possible to marshall a data object from a programming language used by a data processing application to a communication language which can be used by a communication protocol of the computer communication network. This marshalling method comprises the following steps:

reading (E1) a data field included in the data object;

substituting (E5–E7), for the data field, a computer address associated with the data field when the structure of the data field is complex; and storing (E5–E7) said computer address associated with the data field in a table of associations (T).

Use notably for transferring data objects and executing remotely a function on a data object.

26 Claims, 9 Drawing Sheets

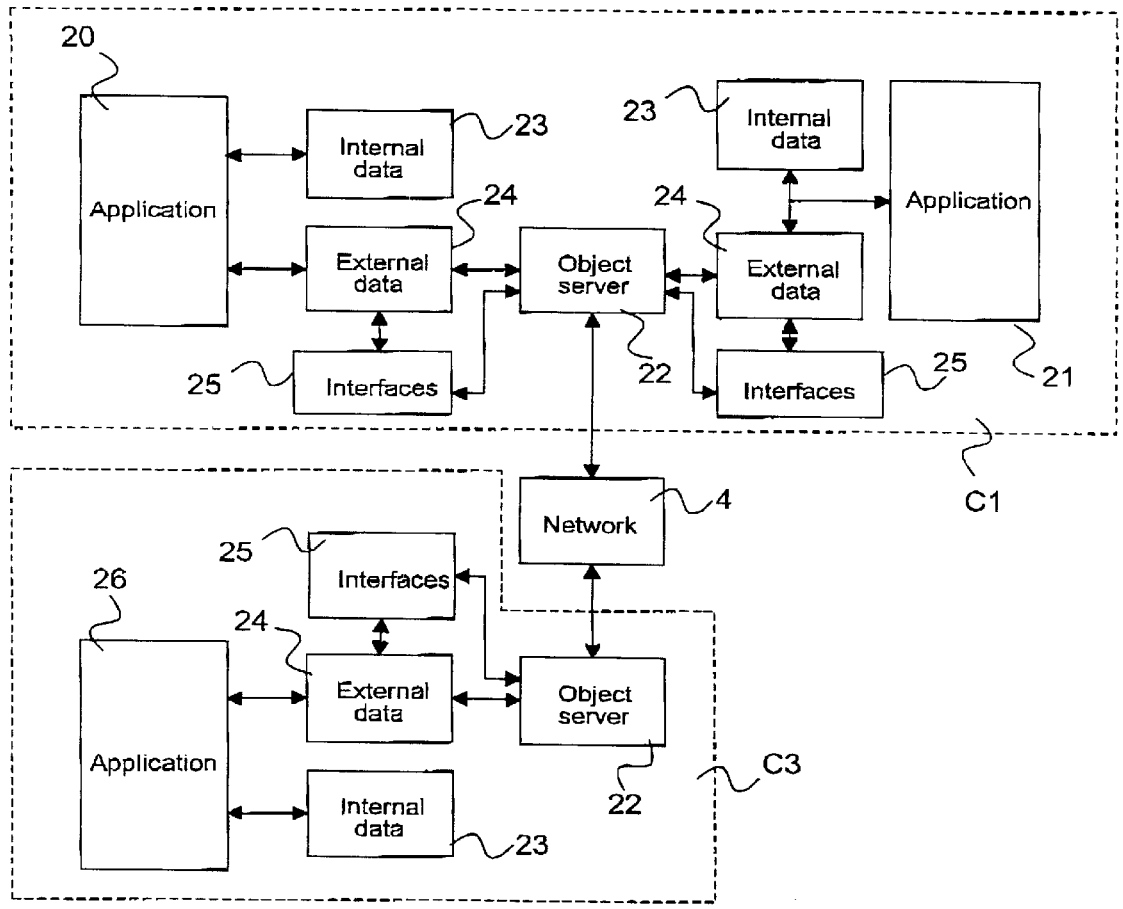

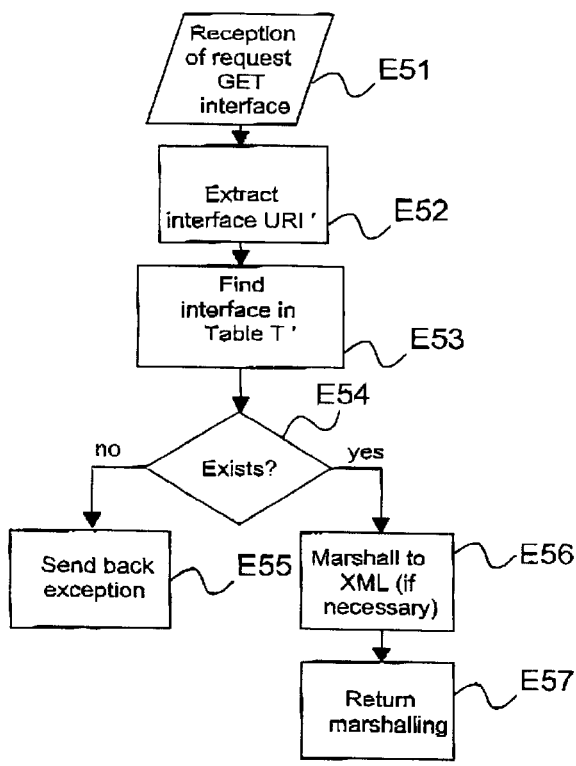
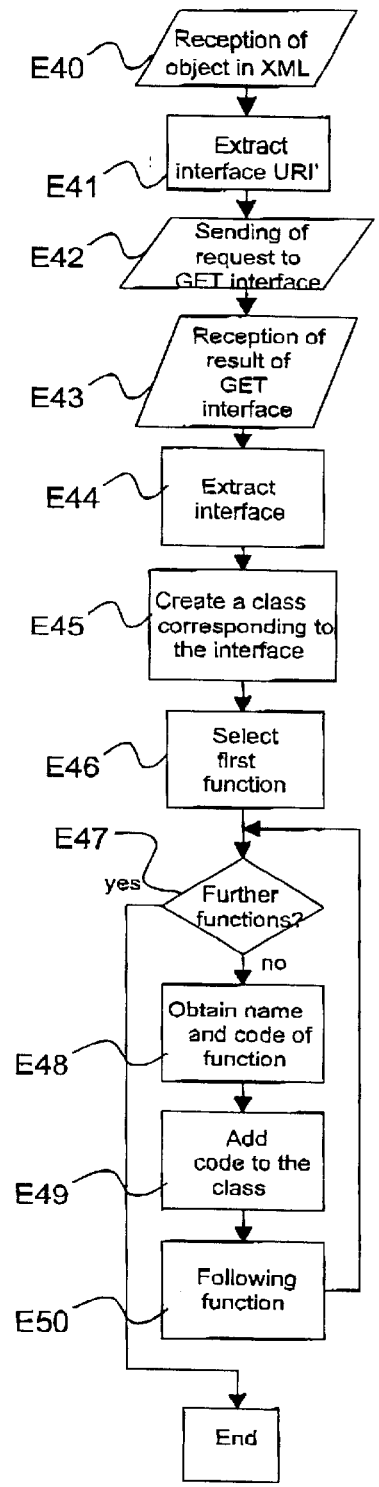
FIG. 11
FIG. 12
FIG. 13

SHARED MANAGEMENT OF DATA OBJECTS IN A COMMUNICATION NETWORK

The present invention aims in general terms to improve the shared management of data objects on communication networks It concerns, according to a first aspect, a method of marshalling a data object on a computer communication network It also concerns a method of transferring a data object on a computer communication network and a method of remote updating a data object on a site in a computer communication network.

The present invention concerns, according to another aspect, a method of executing remotely, on a computer communication network, a function on a data object.

It also concerns a method of activating, on a local computer, a function of a distant data object, a method of transferring an interface on a computer communication network, a method of producing a computer request for activation of a function of a data object on a distant computer and a method of activating, on a computer communication network, a function of a data object on a distant computer.

Correlatively, the present invention concerns a device for marshalling a data object, a device for transferring a data object and a device for the updating remote of a data object on a site in a computer communication network, all adapted to implement the aforementioned methods in accordance with the invention.

The present invention also concerns a device for executing remotely, on a computer communication network, a function on a data object, a device for activating on a local computer a function of a distant data object, a device for transferring an interface on a computer communication network, a device for producing a computer request for activating a function of a data object on a distant computer, and a device for activating on a computer communication network a function of a data object on a distant computer.

The present invention lies in general terms in the field of computer communication networks which make it possible to transfer information between sites connected to the network.

The present invention applies to the communication networks which define a communication protocol between the different sites connected to the network.

Such a network can, by way of non-limitative example, be the worldwide communication network such as the Internet, built on top of the HTTP (Hypertext Transfer Protocol) communication protocol.

Such communication networks also define an annotation language, for example XML (Extended Markup Language), which makes it possible in particular on these networks to connect documents together by hypertext links normally referred to as "pointers".

The present invention aims notably to improve the shared management of data objects on such computer communication networks.

In a distributed object system, the data object is an element comprising data, also referred to as attributes, and functions possibly using input arguments. Conventionally, these functions can be invoked to manipulate the data of the object.

All the functions applicable to an object and attributes constitute its interface.

Each data object is created in a programming language used by a data processing application which is used on the site in the network on which the object is created.

Such programming languages are known, for example, by the name of JAVA or C++.

So that a data object can be shared on a communication network, it is necessary to code it in such a way that it is neither dependent on the architecture of the communication network nor dependent on the programming language in which the data processing application has created the object.

This is necessary since another computer cannot have the same network architecture or may implement a different data processing application.

When the data object is received by another site, a reverse marshalling operation must be applied to the object in order to obtain a representation of the object in the data processing application used on this second site.

The company Allaire Corporation recently developed a WDDX system which makes it possible to distribute data objects on a network. This WDDX system uses an XML communication language for facilitating the exchanges of complex data structures on a communication network.

For example, this WDDX system enables a data structure programmed in C to be marshalled to the XML communication language, then transferred from a first computer to a second computer in the network, and finally unmarshalled on the second computer in an equivalent data structure.

However, this WDDX system is largely unsuited to the marshalling and transfer of a data object having data fields with a complex structure. Such a complex structure is observed in particular when a data field points to or contains at least one other data field which itself may be complex.

The WDDX system in this case requires the XML representation of the higher data structure also to contain the XML representation of the lower data structures, and this recursively.

This way of proceeding considerably affects the performance of the marshalling and transfer of data objects on a network.

In addition, representation in XML communication language unnecessarily occupies a broad bandwidth of the network, whilst the destination site may in reality not need lower data structures.

In addition, this WDDX system concerns only the transfer of data, and does not permit the invocation of function on data at a distance.

In general terms, the interface of the object does not concern the WDDX system.

The company Datachannel has also proposed a Web Broker system which makes it possible to distribute data objects on a communication network.

This Web Broker system makes it possible to define the concept of the interfaces on the network However, it is not possible in this system to obtain a source code for a function catalogued in an interface. Thus it is not possible to reimplement this function on a local computer and to invoke it locally on a copy of a distant object.

The aim of the present invention is to facilitate the sharing of data objects on a communication network.

To this end, the present invention relates first of all to a method of marshalling a data object on a computer communication network, from a programming language used by a data processing application to a communication language which can be used by a communication protocol of the computer communication network, comprising the following steps:

reading a data field included in said data object;

substituting, for said data field, a computer address associated with said data field when the structure of said data field is complex; and storing said computer address associated with said data field in a table of associations.

Thus the method of marshalling a data object according to the invention makes it possible to temporarily replace at least one complex data field with a computer address and if necessary to proceed with the marshalling of this data field to a communication language only when it is required by a site in the communication network.

The data fields included in a data object comprise both data or attributes proper, the interfaces related to this object and the applicable functions.

By virtue of the table of associations in which there are stored the computer addresses associated with each data field, different complex data fields are made visible for all the sites connected to the network.

Only the literal objects are marshalled by value.

These literal objects are for example integers, decimal numbers, Boolean elements, characters or a short chain of characters.

According to a preferred characteristic of the invention, at the storage step, said data field is stored in said programming language.

Thus it is possible to generate in advance representations of the different data fields by means of a computer address stored in the table of associations without actually having to perform the marshalling of this data field from the programming language to the communication language.

This marshalling in the communication language can be postponed until an object is requested by one of the sites in the network via a computer address.

In practice, the complex data structures are chosen from at least one data object, an array or a chain of characters of minimum length.

Thus, when the complex data fields are themselves data objects, the marshalling method according to the invention makes it possible to obtain a representation of a data object by means of links pointing to other data objects, similar to the pointers included in the HTML annotation language used on the Internet.

In this way a graph of data objects is obtained similar to the graph of documents pointing to each other which form the World Wide Web in a communication network of the Internet type.

According to an advantageous characteristic of the invention, the marshalling method includes a step of comparing the structure of a data field with a pre-established list of complex data structures.

This comparison in practice facilitates the detection of the complex data fields included in a data object in order to associate a computer address with them.

According to a second aspect of the invention, a method of transferring a data object on a computer communication network comprises the following steps:
   receiving a computer request to transfer;
   extracting a computer address from said computer request;
   identifying a data object associated with said computer address in a table of associations;
   marshalling said identified data object to a communication language which can be used by a communication protocol of said communication network; and
   transferring said marshalled data object.

Thus, by virtue of the identification of each data object in a table of associations by means of its computer address, the data objects can easily be shared on the communication network and be transferred from one site to another according to requirements.

According to a third aspect of the invention, a method of remote updating a data object on a site in a computer communication network comprises the following steps:
   receiving a computer request to update;
   extracting a computer address from said computer request;
   extracting from said computer request a data object marshalled to a communication language which can be used by a communication protocol of said computer communication network; and
   associating, in a table of associations of said site, said computer address and data object extracted.

It is thus possible to update at a distance a table of associations on a site, from computer requests including both a computer address and a data object marshalled to a communication language.

In practice, when an operation has taken place on a data object and the data fields have been modified, the site on which the data object has been modified can send a broadcast updating computer request to all the sites in the network, so that the latter update the tables of associations stored respectively on these sites.

Each site can also store in memory the list of data objects which have been copied on distant sites, in association with the address of these distant sites, and send an update request to these distant sites when the associated object has been modified.

Preferably the remote updating method also includes a step of marshalling the extracted data object to a programming language used by a data processing application of said site.

Thus each site can update, in its internal data, data objects marshalled to a programming language peculiar to the data processing application of the site.

According to a preferred characteristic of this distance updating method, the association step comprises the following sub-steps:
   identifying the extracted computer address in the table of associations of said site; and
   in the affirmative, substituting the extracted data object for a prior data object stored in association with said extracted computer address in the table of associations.

Thus the table of associations is updated so that the computer address is associated with the new data object transferred.

Preferably, at the substitution step, data fields of the data object extracted are copied to the prior data object stored in the table of associations of said site.

Thus, instead of eliminating overall the prior data object stored in the table of associations, the data fields of the new object are copied one by one to the prior data object. Consequently all the links internal to the application which pointed to the prior data object are still valid and will then point to an updated data object.

Alternatively, the association step comprises the following sub-steps:
   identifying the extracted computer address in the table of associations of said site; and
   in the negative, adding the association of said extracted data object and said extracted computer address in the table of associations of said site.

The table of associations of a site can thus be increased remotely by the insertion of new data objects resulting from a request to update.

According to a fourth aspect of the invention, it relates to a method of executing remotely, on a computer communication network, a function on a data object.

In fact it is generally not possible, in the known systems, to implement a function on a data object stored on a distant computer.

However, in a computer communication network, the main constraint lies in the transmission rate and bandwidth available on this network.

Another aim of the present invention is to permit the execution at a distance, on a computer communication network, of a function on a data object.

According to the invention, this execution method includes a step of transferring, according to a communication protocol of the communication network, the function associated with an execution code of this function.

Thus it is possible to obtain at a distance the execution code of a function catalogued in an interface of a data object.

This makes it possible to transport on the network the behaviour of the data objects rather than only their state.

This method opens the possibility of redefining functions at a distance, since the data processing applications implemented on the computers in the network support at least one execution code, for example a source code such as ECMA Script (JAVA Script 1.3).

Thus the function execution code is made visible on the network.

According to a preferred characteristic of the invention, at said transfer step, said function is also associated with at least one parameter marshalled to a communication language which can be used by the communication protocol of the computer communication network.

Thus the input arguments are also transmitted at said transfer step and make it possible to implement the function by associating chosen input arguments with it.

Preferably the distance execution method includes a step of transferring, according to a communication protocol of the communication network, an interface of a data object, comprising one or more functions associated respectively with the execution code of said functions.

It is thus possible to transfer and make visible on the communication network not only a function associated with a data object, but also the whole of its interface, in which each function catalogued is associated with its execution code, in order to permit the execution of the functions at a distance on the communication network.

In practice, the execution code is a source code, such as the JAVA Script code, a precompiled code, such as a bytecode, or a compiled code, ready to be executed by the data processing application.

According to a fifth aspect of the invention, a method of activating on a local computer a function of a distant data object on a computer communication network includes the following steps:

receiving, on the local computer, a copy of said distant data object marshalled to a communication language which can be used by the communication protocol of the communication network;

extracting from said data object received, at least one computer address referencing an interface of said object;

sending, to a distant computer, a request to get said interface including the computer address; and receiving in response said interface comprising one or more functions associated respectively with the execution code for said functions.

The activation method thus makes it possible to copy on a local computer both a distant data object and at least one associated interface, so that the functions of the object can be applied directly to the local computer, on a copy of the object.

The execution of this function is then no longer dependent on the bandwidth available on the network, which constitutes the bottleneck in such a communication system.

In addition the activation of this function can also be implemented when the local computer is connected only intermittently to the network.

It should be noted that the execution code associated with each function of the interface can be directly included in the response, being marshalled in a communication language which can be used by the network, or only included by reference by means of a computer address referencing this execution code on the network. In the latter case, the local computer can require the transfer of this execution code in a deferred manner, only when the associated function is to be executed.

According to an advantageous characteristic, the activation method also includes a step of creating a class in a programming language used by a data processing application of said local computer, said class comprising the function or functions of said interface received and the execution code of these functions.

In this way a standard class is obtained, similar to that which would have been obtained by compiling a class on the local computer from an associated source code.

According to a sixth aspect of the invention, a method of transferring an interface on a computer communication network, in response to a get request sent at the sending step of the activation method according to the invention, comprises the following steps:

receiving said get request;

extracting the computer address referencing said interface;

identifying said interface in a table of associations storing said computer address in association with an interface; and transferring said interface marshalled to a communication language which can be used by the communication protocol of the network, comprising one or more functions associated respectively with the execution code for said functions.

This method of transferring an interface thus makes it possible, in a practical manner, to find, by virtue of a table of associations, the interface associated with a data object, and to transfer this interface to another computer in the network, in order to permit the execution at a distance of this function on a copy of the data object.

According to a seventh aspect of the invention, a method of producing a computer request for activating a function of a data object on a distant computer in the computer communication network, includes the following steps:

entering a computer address referencing said data object;

entering an identifier of the function; and adding the execution code associated with said function.

By virtue of the production of this computer request, in which, in addition to the function to be executed, the execution code associated with this function is also introduced, it is possible to execute this function at a distance on a data object stored in a distant computer in the network.

Thus the functionalities of the distant computer are not fixed, but can be increased through the reception of such computer requests for remote activation, which make it possible to identify both the function and its execution code.

According to an eighth aspect of the invention, a method of activating on a computer communication network a function of a data object on a distant computer includes the following steps:

receiving an activation request produced in accordance with the producing method in accordance with the invention;

extracting, from this activation request, the computer address referencing the data object;

extracting the identifier of said function;

extracting the execution code associated with said function; and executing said code extracted on the data object.

It is thus possible to invoke and activate at a distance a function on a data object of the communication network Correlatively, the present invention concerns a device for marshalling a data object on a computer communication network, from a programming language used by a data processing application to a communication language which can be used by a communication protocol of said computer communication network, having:

means of reading a data field included in said data object;

means of substituting, for said data field, a computer address associated with said data field when the structure of said data field is complex; and means of storing said computer address associated with said data field in a table of associations.

According to the second aspect of the invention, a device for transferring a data object on a computer communication network has:

means of receiving a computer request for transfer;

means of extracting a computer address from said computer request;

means of identifying a data object associated with said computer address in a table of associations;

means of marshalling said identified data object to a communication language which can be used by a communication protocol of said communication network; and means of transferring said marshalled data object.

According to the third aspect of the invention, a device for the updating remote of a data object on a site in a computer communication network has:

means of receiving a computer request to update;

means of extracting a computer address from said computer request;

means of extracting from said computer request a data object marshalled to a communication language which can be used by a communication protocol of said computer communication network; and means of associating, in a table of associations of said site, said computer address and computer object extracted.

According to the fourth aspect of the invention, a device for executing remotely, on a computer communication network, a function on a data object, comprises transfer means according to a communication protocol of the communication network, adapted to transfer said function associated with an execution code of said function.

According to the fifth aspect of the invention, a device for activating on a local computer a function of a distant data object on a computer communication network comprises:

means of receiving, on the local computer, a copy of said distant data object marshalled to a communication language which can be used by the communication protocol of the communication network;

means of extracting from said data object received, at least one computer address referencing an interface of said object;

means of sending, to a distant computer, a request to get said interface including the computer address; and means of receiving in response said interface comprising one or more functions associated respectively with the execution code for said functions.

According to the sixth aspect of the invention, a device for transferring an interface on a computer communication network, in response to a get request sent by the sending means of said activation device according to the invention, comprises:

means of receiving said get request;

means of extracting the computer address referencing said interface;

means of identifying said interface in a table of associations storing said computer address in association with an interface; and means of transferring said interface marshalled to a communication language which can be used by the communication protocol of the network, comprising one or more functions associated respectively with the execution code for said functions.

According to the seventh aspect of the invention, a device for producing a computer request for activating a function of a data object on a distant computer in the computer communication network comprises:

means of entering a computer address referencing said data object;

means of entering an identifier of said function; and means of adding the execution code associated with said function.

According to the eighth aspect of the invention, a device for activating on a computer communication network a function of a data object on a distant computer comprises:

means of receiving an activation request produced in accordance with the producing method in accordance with the invention;

means of extracting, from said activation request, the computer address referencing the data object;

means of extracting the identifier of said function;

means of extracting the execution code associated with said function; and means of executing said code extracted on the data object.

The characteristics and advantages of these different devices are similar to those described previously, respectively for the methods according to the invention which they implement.

The present invention also concerns a computer comprising a device for marshalling a data object and/or a device for transferring a data object and/or a device for remote updating, and/or a device for remote execution, and/or a device for activation of a function on a local computer and/or an interface transfer device, and/or a device for producing an activation computer request and/or a device for activating a function on a distant computer, all in accordance with the invention.

It also relates to a computer communication network including a device for marshalling a data object and/or a device for transferring a data object and/or a remote updating device and/or a remote execution device and/or a device for activating a function on a local computer and/or an interface transfer device and/or a device for producing an activation computer request and/or a device for activating a function on a distant computer, all in accordance with the invention.

This computer and this computer communication network have advantages similar to those described previously in relation to the methods according to the invention.

The present invention also relates to a computer program stored on a storage means or an information carrier, possibly removable, incorporated or not into a computer, comprising portions of software code or program instructions adapted to implement the steps of the marshalling method according to the invention and/or the steps of the transfer method according to the invention and/or the steps of the remote updating method according to the invention and/or the steps of the remote execution method and/or the steps of the method of activating a function on a local computer and/or the steps of the interface transfer method and/or the steps of the method of producing an activation computer request and/or the steps of the method of activating a function on a distant computer, all in accordance with the invention, when said computer program is run into a computer.

Other particularities and advantages of the invention will also appear in the following description.

In the accompanying drawings, given by way of non-limitative examples:

FIG. 5 is a block diagram illustrating two computers adapted to implement the present invention;

FIG. 6 is a schematic representation of a memory space adapted to store a table of associations;

FIG. 11 is a schematic representation of a memory space adapted to store a table of associations of interfaces;

FIG. 12 is an algorithm illustrating a method of activating a function on a local computer according to a fifth aspect of the invention;

FIG. 13 is an algorithm illustrating an interface transfer method according to a sixth aspect of the invention;

The present invention, one embodiment of which will be described below, applies in general to computer communication networks.

It applies particularly well to wide area communication networks in which a very large number of computer servers are connected together.

Such a network can by way of example be the worldwide communication network, such as the Internet, built on top of a communication protocol which enables the computers connected to the communication network to exchange documents.

Figure 1:
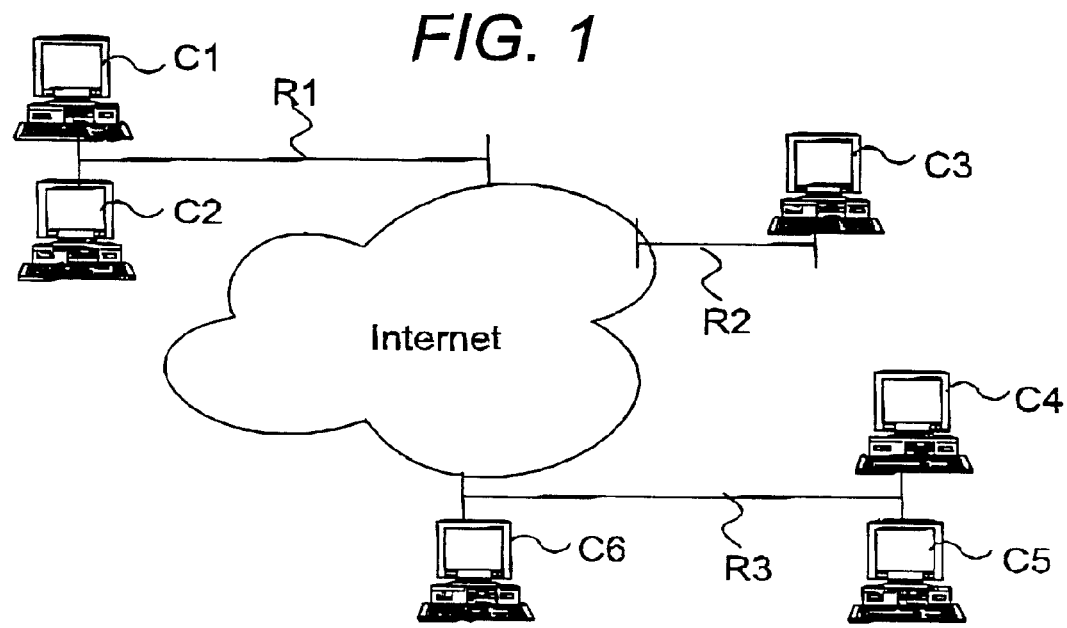
FIG. 1 illustrates schematically communication networks adapted to implement the present invention.

Such an Internet network is illustrated for example in FIG. 1.

In this example, and non-limitatively, three computer networks R1, R2 and R3 are networks of the Ethernet type, connected together, for example. by means of an Internet network.

Each network R1, R2 and R3 has one or more computers. Here, by way of example, the network R1 has two computers C1, C2; the network R2 has a single computer C3; and the network R3 has three computers C4, C5 and C6.

Each of these computers C1, C2, C3, C4, C5, C6 is therefore capable of sending and receiving data to and from any one of the other computers.

In such a network, it is normal for an information system, where the information is stored in documents, to be built on top of the communication network.

Such an information system can be a hypertext system so that the documents stored include hypertext links, also referred to as pointers, linking certain documents together. In other words, documents include pointers pointing to other documents, and a user of the network can request the transmission of these other documents by activating the pointers in an initial document.

By way of example, the conventional hypertext system built on top of the Internet communication network is the WWW (World Wide Web) system, where the communication protocol used can be the Hyper Text Transfer Protocol HTTP.

In such a communication network, all the documents grouped in the memory of a computer server form a data processing site, so that the communication network makes it possible to connect a very large number of sites together. It will be easily be understood that each of the computers C1 to C6 illustrated in FIG. 1 can in turn be a computer server adapted to serve documents in response to requests sent over the network, or a user of the communication network (also referred to as a client), adapted to send requests for requesting documents on this network.

In addition to these documents forming a conventional information system on a communication network, the computers C1 to C6 can also store and create data objects by virtue of data processing applications.

A data object is defined as an element comprising at the same time different attributes, and a set of functions which make it possible to manipulate the data of the object. This set of functions and attributes forms an interface of the data object.

Each data object can be created in a programming language used by a data processing application. Such programming languages are known, for example, under the name of JAVA or C++.

It is conventional, in such a distributed objects system, for these data objects to point to each other, that is to say certain data fields of an object are themselves data objects.

Figure 2:
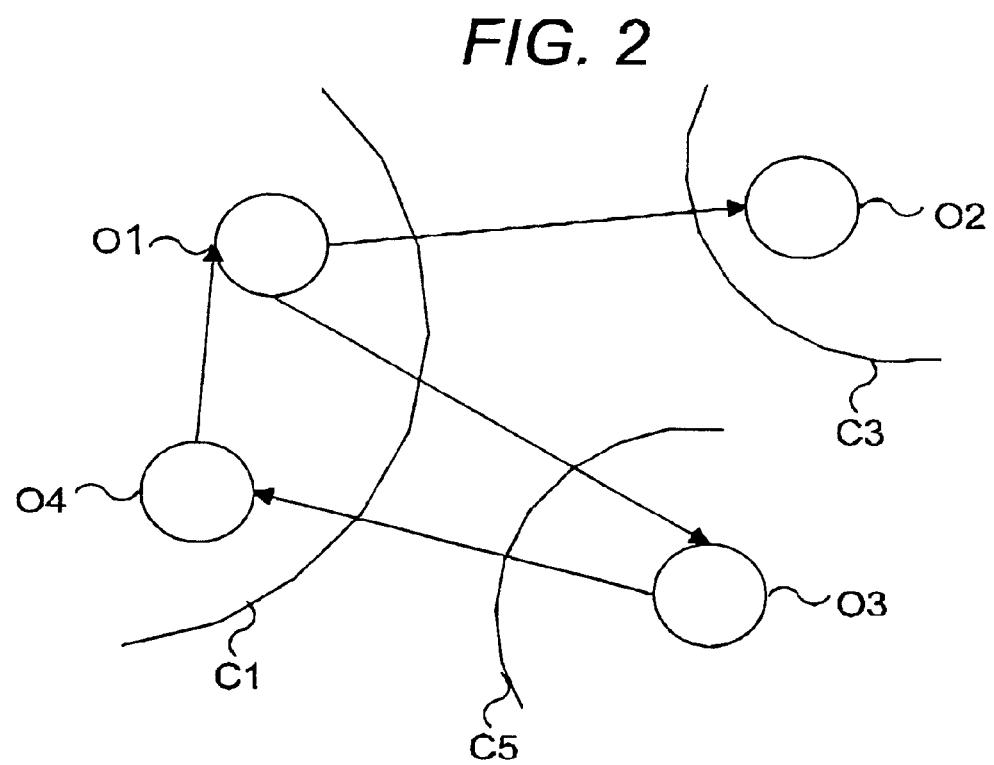
FIG. 2 is a graph illustrating schematically a distributed objects system.

FIG. 2 illustrates notably objects which point to each other by means of links illustrated by arrows.

Thus a first object O1, resident on the computer C1, points both to an object O2 resident on a computer C3 and to an object O3 resident on a computer C5.

This object O3 in its turn points to an object O4 resident on the first computer C1.

Here the object O4 points in its turn to the object O1, these two objects O1 and O4 residing on the same computer C1.

The graph in FIG. 2 is only one example amongst others of a system of objects pointing to each other. In general terms, it suffices to specify that certain objects, such as O1 and O3, can be both pointing objects and pointed-to objects and that the objects pointing to each other can belong to the same computer, such as the objects O1 and O4, or to different computers, such as the objects O1 and O2.

Figure 3:
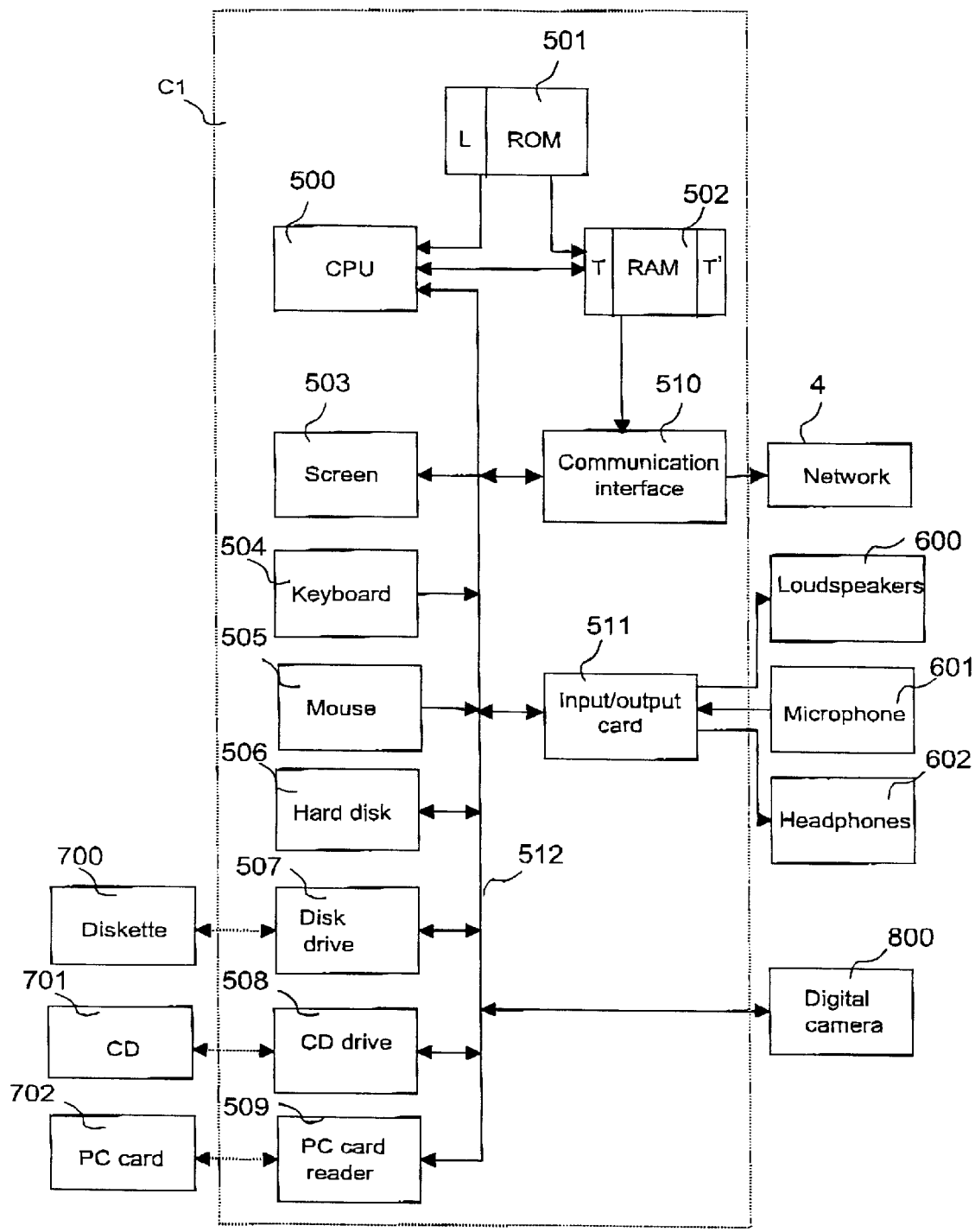
FIG. 3 is a block diagram illustrating a computer adapted to implement the invention.

A computer adapted to implement the invention is also illustrated in FIG. 3, for example the computer C1 in the communication network R1.

This computer has a microprocessor 500, a read only memory 501 comprising a program for implementing the invention, and a random access memory 502 containing registers adapted to record the variables modified during the running of the program.

This computer C1, for example, can be connected to different peripherals, such as a digital camera 800, microphone 601, headphones 602 or loud-speaker 600 by means of an input/output card 511 in order to receive and store documents.

This computer C1 has a communication interface 510 connected to a communication network 4, such as the Ethernet network R1.

The computer C1 also has document storage means, such as a hard disk 506, or is adapted to cooperate, by means of a disk drive 507, a compact disk drive 508 or a computer card reader 509, with removable document storage means, respectively diskettes 700, compact discs (CDs) 701 or computer cards (PC cards) 702).

These fixed or removable storage means can also contain the code of the method according to the invention which, once read by the microprocessor 500, will be stored in the hard disk 506.

By way of variant, the program adapted to implement the invention could be stored in the read only memory 501.

As a second variant, the program could be received and then stored as described previously by means of the communication network R1.

The computer C1 also has a screen 503 for serving, for example, as an interface with the operator by means of the keyboard 504 or the mouse 505 or any other means.

The central unit 500 will execute the instructions relating to the implementation of the invention. When the computer C1 is powered up, the programs and methods relating to the invention stored in a non-volatile memory, for example the read only memory 501, are transferred into the random access memory 502, which will then contain the executable code of the invention as well as the variables necessary for implementing the invention.

The communication bus 512 allows communication between the different sub-elements of the computer C1 or connected to it. This representation of the communication bus 512 is not limitative, and in particular the microprocessor 500 is able to communicate instructions to any sub-element directly or by means of another sub-element.

Figure 4:
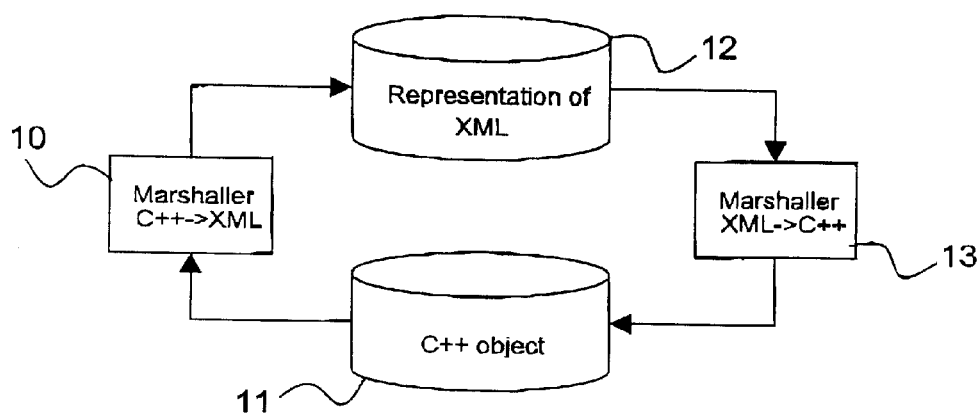
FIG. 4 is a diagram illustrating the direct and reverse marshalling of a data object, from a programming language to a communication language.

The computer C1 has a marshalling device 10 as depicted schematically in FIG. 4.

Naturally, each computer C1 to C6 in the communication network can include such a marshalling device.

The marshaller makes it possible to marshall a data object 11 created in a computer language, here an object C++, to a communication language such as the XML language which can be used in the HTTP communication protocol of an Internet network.

The same computer also has a reverse marshalling device 13 which makes it possible to effect the reverse conversion in order to transform an object 12 depicted in a communication language into an object 11 in a data processing language.

The marshalling operation performed by the marshaller 10 thus makes it possible, on a computer, to make visible the objects created by an application of this computer, or in other words to publish them on the network.

An example of a communication language which can be used on the Internet network is given below, with the description of the different data fields which it is necessary to marshall in order to share data objects between the different sites connected to the communication network This communication language is an improved version of the XML language.

Field: Objects

This enables several objects to be sent to a distant application. This distant application has no need to wait for all the objects to have been received in order to begin their reverse marshalling in the data processing language used by the distant application, by the marshaller 13.

```
<objects>
    <object>...</object>
    <int.../>
    <exception.../>
    <ordered-sequence>...</ordered-sequence>
    ...
</objects>
```

Field: Object

This makes it possible to code an object which is neither a literal object, such as an integer, a decimal number, a Boolean element, a character or a short character chain, nor a container object such as a chain, an interval or a table of diverse objects.

```
<object
    href="http://oceania/web-obj/obj/person1.xml">
    <int name="age" value="33"/>
    <object-ref
        name="spouse"
        href="http://oceania/web-obj/obj/person2.xml"/>
    ...
</object>
```

The object can have its URI computer address as an attribute. It can include other data objects, container objects, literal objects and references to objects. The objects can also include one or more references to interfaces and thus support all the operations or functions comprised in this interface.

In accordance with the marshalling method of the invention, although the data objects and container objects can be included directly in the data objects marshalled to this communication language, it is preferable that only the literal objects be marshalled and that the other objects be included only by reference.

Field: Interfaces

In accordance with one aspect of the invention, it makes it possible to send several interfaces to distant applications. As before, the distant application has no need to await the reception of all the interfaces in order to effect their reverse marshalling to the language used by the application and to use them.

```
<interfaces>
    <interface>...</interface>
</interfaces>
```

Field: Interface

This corresponds to the generic concept of "Type" or a "Class" of object, as defined in the JAVA or C++ languages.

An interface describes the operations which are supported by an object. These operations generally use input arguments and possibly supply a result.

An interface also describes the attributes or data fields which all the objects supporting this interface contain when they are marshalled to the communication language.

An interface can also contain a reference to other interfaces, whether it extends to these other interfaces or only supplies a shorthand for using these other interfaces. The object then supports all these other interfaces referenced.

There also exist predefined interfaces for literal objects and complex objects.

```
<interface
    name="Employee"
    href="http://oceania/web-obi/class/Employee.xml">
    <attributes>...<attributes>
    <functions>...</functions>
</interface>
```

Field: Attribute

This contains the list of the attributes which an object supporting the interface contains when it is marshalled to the communication language. This list can contain literal objects, container objects, data objects themselves and references to objects. It can also be empty.

Preferably the data objects and container objects are replaced at the time of marshalling by references to these objects using a URI computer address.

```
<attributes>
    <int.../>
    <object>...</object>
    <keyed-sequence-ref.../>
    ...
</attributes>
```

Field: functions

This contains a list of the functions or operations associated with the data object supporting this interface.

```
<functions>
    <function>...</function>
</functions>
```

Field: function

This corresponds to the generic concept of "function" or "method". A function is identified by its signature, for example a name, the type of input argument used and the type of object obtained when this function is executed.

In accordance with the fourth aspect of the invention, a function can contain its execution code such as the source code, the bytecode or the compiled code. In this case, the function can be implemented by a distant application.

```
<function
    name="square"
    type="int">
    <arguments>...</arguments>
    <code>...</code>
</function>
```

Field: arguments

This contains the list of input arguments which a function needs for its implementation.

```
<arguments>
    <arg>...</arg>
    ...
</arguments>
```

Field: argument

This corresponds to an input argument of a function and can be a literal object, a container object, a data object or a reference to one of these objects by means of a URI computer address.

```
<arg
    name="x"
    type="int"/>
```

Field: Code

This contains the execution code for a function and possibly the computer language in which the code is supplied. The type of code can be specified, for example source code such as JavaScript, bytecode such as Java or compiled code such as C++.

It should be noted that, when a data object is marshalled, a function might not specify its execution code. In addition, if this code is too large, it may be included by reference by means of the attribute "href".

```
<code
    language="JavaScript"
    type="source"
    href="http://oceania/web-obj/code/Integer/square.is">
    ...
</code>
```

A non-limitative list of fields for representing literal objects is also given below.

```
Field: Integer
<int
    name="age"
    value="33"/>
Field: Decimal point
<float
    name="pi"
    value="3.14159"/>
Field: Boolean element
<bool
    name="isRoot"
    value="true"/>
Field: Character
<char
    name="key"
    charset="iso-8859-1"
    value="C"/>
Field: Chain
```

It should be noted that this field is preferably used, in accordance with the first aspect of the invention, only for short character chains, the other chains preferably being included by reference by means of the attribute "ref".

```
<string
    name="title"
    charset="iso-8859-1">The complete Shakespeare's work.
</string>
```
Field: Time
```
<time
    name="now"
    value="13:13:57 GMT"/I>
```
Field: Date
```
<date
    name="today"
    value="Fri, 05 Mar 1999/>
```
Field: URI address
```
<uri
    name="CRF"
    value="http://www.crf.canon.fr/"/>
```

Field: Exception
This corresponds to the generic concept of exception, which makes it possible to indicate that an error has occurred.

```
<exception
    value="index not found"
    href="http://oceania/web-obj/ex/IndexNotFound.xml">
```

An non-limitative list of fields for representing container objects is also given below.

Field: Interval
This corresponds to the generic concept of interval, with an upper limit and a lower limit, of the same type and whose order is important

```
</interval>
    <int name="lower" value="1" />
    <int name="upper" value="10" />
    <int name="step" value="2" />
</interval>
```

Field: Unordered set
This corresponds to the generic concept of a set containing various objects whose order is unimportant.

```
<unordered-sequence>
    <int.../>
    <int.../>
    ...
</unordered-sequence>
```

Field: Ordered set
This corresponds to the generic concept of an array containing various objects whose order is significant.

```
<ordered-sequence>
    <object-ref.../>
    <object-ref.../>
    ...
</ordered-sequence>
```

The references by means of a URI computer address should be used for including data objects or container objects in these sets.

Field: Coded sequence
This corresponds to the generic concept of an array or a dictionary in which objects are accessible not directly but by means of keys. These keys can themselves be various objects. The order of the objects is unimportant.

```
<keyed-sequence>
    <key>...</key><value>...</value>
    ...
</keyed-sequence>
```

Field: Key
This is used for differentiating one key in a collection of keys.

```
<key>
    ...
</key>
```

Field: Value
This is used for differentiating the value of one key in a collection of keys.

```
<value>
    ...
</value>
```

Fields are also defined in order to include another field by reference.

Field: Interface reference
This makes it possible to reference an interface by means of a name and a URI computer address.

```
<interface-ref
    name="Person"
    href="http://oceania/web-obj/class/Person.xml">
```

Field: Object reference
This makes it possible to reference an object by means of a name and a URI computer address.

```
<object-ref
    name="child"
    href="http://oceania/web-obj/obj/child1.xml"/>
```

Field: Chain reference
This makes it possible to reference a chain by means of a name and a URI computer address
Preferably short character chains are marshalled as objects and long chains are marshalled by reference, in order to reduce the occupation of the communication network. The threshold value chosen for sorting long chains and short chains may be dependent on the data processing application.

```
<string-ref
    name="speech"
    href="http://oceania/web-obj/obj/speech1.xml"/>
```

Field: Unordered set reference

This makes it possible to reference an unordered set by means of a name and a URI computer address.

```
<unordered-seqref
    name="childrens"
    href="http://oceania/web-obj/obj/set1.xml"/>
```

Field: Ordered set reference

This makes it possible to reference an ordered set by means of a name and a URI computer address.

```
<unordered-seqref
    name="childrens"
    href="http://oceania/web-obj/obj/array1.xml"/>
```

Field: Coded set reference

This makes it possible to reference an unordered coded set by means of a name and a URI computer address.

```
<unordered-seqref
    name="childrens"
    href="http://oceania/web-obj/obj/dictionary1.xml"/>
```

Field: Null

This makes it possible to reference a non-existent object.

Field: Functions

This makes it possible to contain a list of functions which must be applied to a distant object, in deferred mode, for example if the application is connected intermittently to the network. The application can prepare the request in advance, send it subsequently and receive in response a set of objects.

```
<functions>
    <function>...</function>
    <function>...</function>
    <function>...</function>
    <function>...</function>
    ...
</functions>
```

The response is a set of various objects, in the order of execution of the functions enumerated in the request.

```
<objects>
    <object>...</object>
    <int.../>
    <exception.../>
    <object-ref.../>
    ...
</object>
```

Field: Function

This makes it possible to invoke a function on a distant object. It is necessary to specify the target object and the parameters of the function as described previously. The target object can be omitted when the request is addressed directly to the URI computer address of the object. The response consists of an object or an exception in the case of error.

```
<function
    name="square"
    href="http://oceania/web-obj/obj/calculator1.xml?square">
    <target
        href="http://oceania/web-obj/obj/calculator1.xml"/>
    <arguments>
        <int value="5"/>
    </arguments>
</function>
```

In accordance with one aspect of the invention, if an application wishes to execute a code on a distant object, it is necessary to supply the execution code instead of the function itself. An exception will be sent in return if the distant application does not have the capacity to dynamically evaluate the functions.

```
<function>
    <target
        href="http://oceania/web-obj/obj/calculator1.xml"/>
    <arguments>
        <int value="5"/>
    </arguments>
    <code
        language="JavaScript">
        ...
    </code>
</functon>
```

This communication language makes it possible to exchange on the network not only the data objects and their attributes but also the interfaces of these objects.

Thus the functions associated with the objects are easily shared on the network and can be executed on distant objects.

As illustrated in FIG. 5, the same computer C1 can use two applications 20, 21 which cooperate with each other. These two applications 20, 21 can share the data via the same object server 22. Each of the applications 20, 21 uses on the one hand internal data 23 and on the other hand external data 24 which are made visible to the other applications by the use of a marshaller as described previously in FIG. 4.

The external data 24 are in fact internal data 23 created or used by each of the applications 20, 21, which have been marshalled by a marshaller 10 in a communication language common to the two applications and which can thus be transmitted to one or other of the applications via the object server 22.

Interfaces 25 make it possible to list the functions and the attributes linked to the data objects.

Naturally, a similar function is obtained between two computers C1, C3 connected by a network 4 of the Internet type.

As illustrated in FIG. 5, the computer C3 has a third application 26 which also uses internal data 23 and external data 24. These external data 24 are also obtained by marshalling certain internal data 23 created by a data processing application 26 of the computer C3.

These external data 24 are thus made visible for the applications 20 and 21 of the computer C1 by means of the communication network 4, via an object server 22 similar to the object server 22 of the computer C1.

Figure 7:
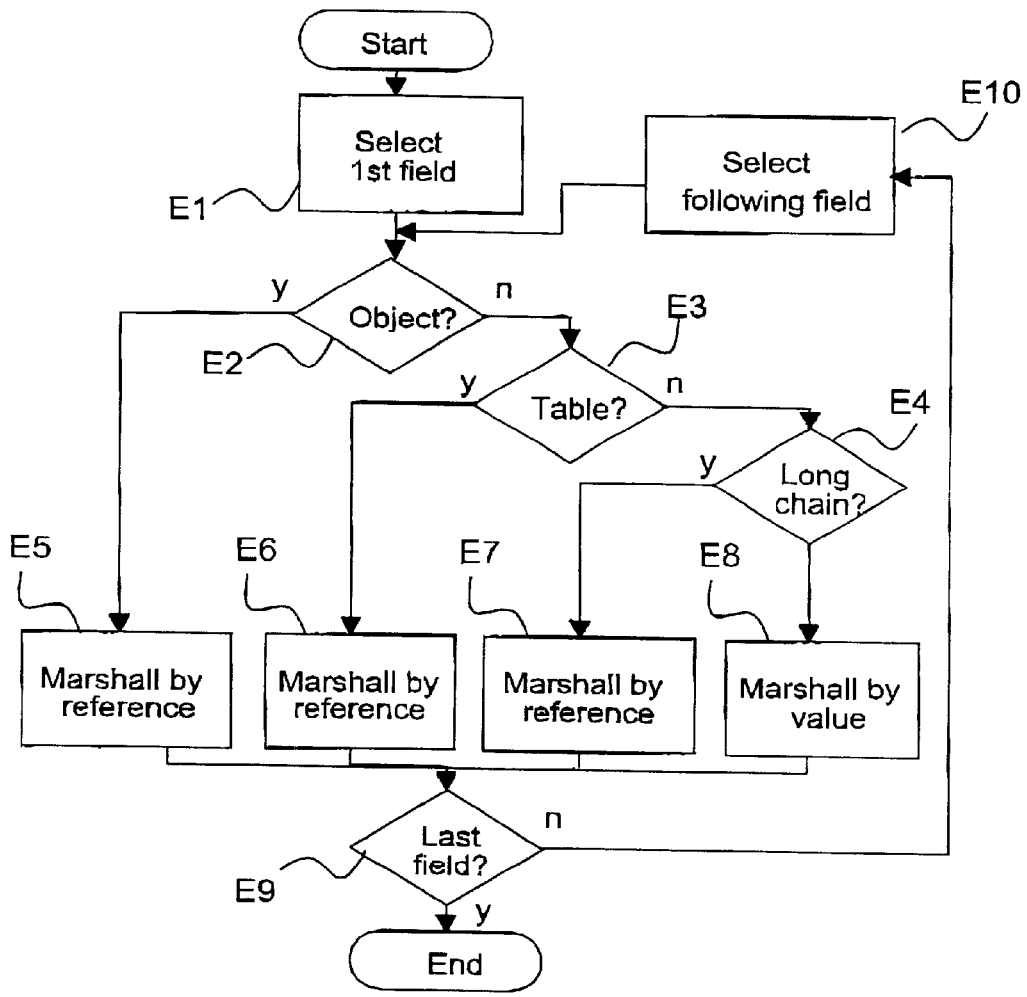
FIG. 7 is an algorithm illustrating a method of marshalling a data object according to a first aspect of the invention.

A description will now be given, with references to FIGS. 6, 7 and 11, of a marshalling method which makes it possible to publish on the network 4 a data object and its interface.

Non-limitatively, in this example, the marshalling of an object O1 on a computer C1 as illustrated in FIG. 2 is considered.

Naturally, the marshalling can be carried out on any computer C1 to C6 in the network 4.

This object O1 may have been created in a programming language used by the data processing application 20 implemented on the computer C1, for example in C++ language.

This data object O1 is marshalled to a communication language which can be used by the HTTP communication protocol of the computer communication network 4.

It includes first of all a step E1 of reading a data field included in the data object O1. For this, a first data field included in the object O1 is selected.

A series of test steps E2, E3 and E4 determines whether the structure of this data field is a complex or simple structure.

Typically, complex data structures are for example an array, a chain of characters of minimum length or a data object itself. Other examples of data fields with a complex structure have been given previously, with reference to the communication language used by way of example.

In practice, the structure of each data field is compared with a pre-established list L of complex data structures. This pre-established list L can be stored in the read only memory 501 of the computer C1, as illustrated in FIG. 3.

Thus it is possible to first of all check in a test step E2 whether the data structure is itself a data object.

In the affirmative, a step E5 of marshalling by reference is implemented as described below.

Otherwise a second test step E2 checks whether the structure of the data field is an array.

In the affirmative, a step of marshalling by reference E6 is also implemented as described below.

Otherwise a last test step E4 is implemented to check whether the data field is a chain of characters of minimum length T.

In the affirmative, a third step of marshalling by reference E7 is implemented as described below. Otherwise it is considered that the structure of the data field is simple and a step E8 of marshalling by value is implemented, making it possible to marshall all the data field to the communication language.

The steps E5, E6 and E7 of marshalling by reference constitute a step of substituting a URI ("Uniform Resource Identifier") computer address for the data field.

This substitution step E5, E6 and E7 consists in reality of not directly marshalling the entire complex data field, but substituting for it a computer address making it possible to find this data field if necessary.

These same steps of marshalling by reference E5, E6 and E7 also comprise a step of storing this URI computer address associated with the data field in tables of associations T and T' as illustrated in FIGS. 6 and 11.

These tables of associations T and T' are set up, for example, in the random access memory 502 and then stored in a non-volatile memory, such as in the hard disk 506 of the computer C1 illustrated in FIG. 3 These tables of associations T and T' thus make it possible to store associations of a complex data field with a URI computer address.

By way of example, here, in the marshalling of the data object O1, two other data objects O2 and O3, included in the data fields of the data object O1, are stored in the first table T in association respectively with a computer address URI1 and URI3.

The data object O1 can also include a data structure in the form of an array Al, stored in association with a computer address URI2.

It can also include a chain S1 with a length greater than a predetermined threshold value, in association with another computer address URI4.

This marshalling method avoids marshalling all the data fields of a computer object O1.

Moreover, the second table of associations T' makes it possible to store interfaces I1, I2, . . . , Ip in association respectively with a computer address URI1', URI2', . . . URIp'.

Preferably, in these tables T and T', the data fields O2, A1, O3, S1 . . . Om and the interfaces I1, I2, . . . , Ip are stored in the programming language, that is to say here in a computer language C++.

Thus the interfaces can be used directly by the data processing application of the computer C1, in the form of a standard class.

The marshalling is deferred, in order to be performed only if necessary, when the data field or the interface is requested by another data processing application and must be transferred over the communication network.

The second table T' of interfaces makes it possible, given a computer address URI', to find the corresponding interface. It enables a server to manage the interfaces of the objects which it supports.

It should also be noted that another table could be stored on the server, making it possible to associate, with a type of data object, the address URI' of the corresponding interface.

For implementing the marshalling method according to the first aspect of the invention, means of reading data fields, substitution and storage are incorporated in the microprocessor 500 of the computer C1, the read only memory 501 storing the program instructions for implementing the method and the random access memory storing, in registers, the variables modified during the execution of the marshalling, and in particular the tables of associations T, T'.

Figure 8:
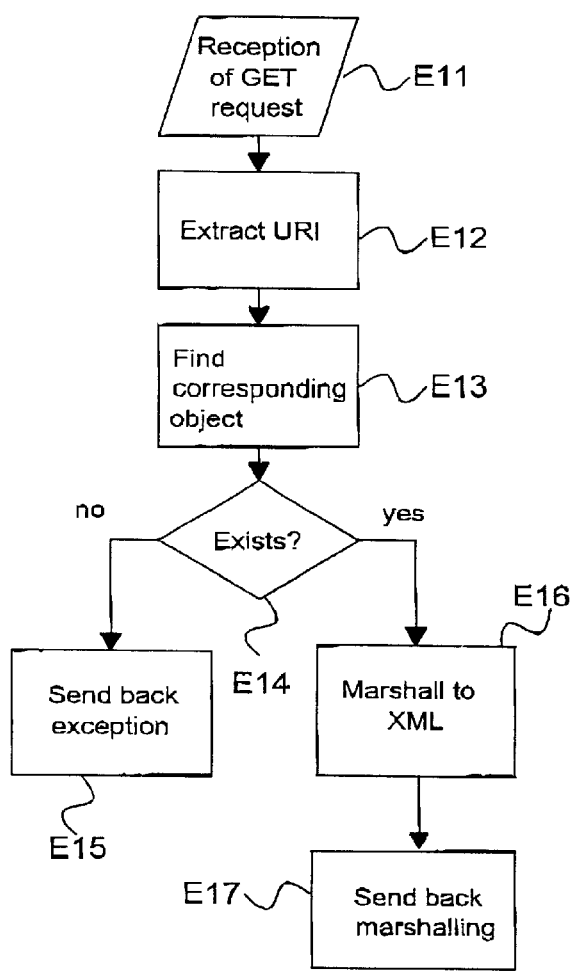
FIG. 8 is an algorithm illustrating a method of transferring a data object according to a second aspect of the invention.

Moreover, the present invention also concerns a method of transferring a data object over a computer communication network as illustrated in FIG. 8. This computer object transfer method makes it possible to call for data objects on the communication network, as soon as these objects have been made visible by the marshalling method as described previously and are referenced in a table of associations T by means of their URI computer address.

This transfer method includes essentially a step E11 of receiving a computer request to transfer.

This computer request to transfer can have a conventional HTTP request format defined by the communication protocol of the Internet.

It can include notably a field in which the computer address of the required object is entered.

An example of a transfer request GET for an object is given below:

Let the data object be as follows:

```
<object
    href="http://oceania/web-obj/obj/person1.xml">
    <int name="age" value="33"/>
    <object-ref
        name="spouse"
        href="http://oceania/web-obj/obj/person2.xml"/>
    ...
</object>
```

This object ("person1") is situated at the following computer address:

http://oceania/web-obj/obj/employee1.xml

It can be transferred using a transfer request GET in accordance with the HTTP communication protocol:

```
GET /web-obj/obj/person1.xml HTP/1.1
...
```

The objects included in the other objects have a name such that they can be obtained by concatenating the address of the object with the name of the object included. For example, the object "age" of the previous example can be obtained directly using the following URI computer address:

http://oceania/web-obj/obj/employee1.xml#age

This literal object can also have its own URI address:

http:/oceania/web-obj/obj/interger1.xml

A function can also be referenced by concatenating the address of the interface which defines it with the name of the function:

http://oceania/web-obj/class/Calculator.xml#square

An extraction step E12 is then implemented in order to extract a computer address, for example URI1, of the computer request to transfer.

An identification step E13 next makes it possible, on the computer which receives the request, to find the data object O2 associated with the computer address URI1 in the table of associations T.

More precisely, a test step E4 makes it possible to check whether a data object is indeed associated with the computer address URI1 extracted from the table of associations T.

In the negative, in a conventional manner on a communication network, the computer sends back, by way of response, an exception, with a message of the type "object absent".

On the other hand, if the object O2 is found in the table of associations T, a marshalling step E16 is implemented to marshall this identified data object O2 to the XML communication language defined by the communication network.

A step E17 of transferring this marshalled data object O2 is then implemented in response to the transfer request sent.

The reception, extraction, identification, marshalling and transfer means of the transfer device are incorporated in the microprocessor 500 of the computer C1, the read only memory 501 storing the program instructions for transferring an object and the random access memory containing registers for storing the variables modified during the execution of the transfer method.

There is thus obtained, by virtue of the marshalling method according to the invention, a distributed objects system on the communication network similar to the Web formed by all the documents accessible on this network.

In comparison with the existing distributed objects systems, the invention makes it possible to introduce advantages related to the communication network to a system of shared data objects on the network, and in particular:

to hide objects in proxy servers of the Web;

to transport these objects in a secure manner according to the SSL (Secure Socket Layer) or SHTTP (secure HTTP) protocol;

to sign these objects numerically;

to include these objects in electronic messages of the e-mail type;

to represent these objects visually using style sheets, for example written in the XSL language (Extended Style Sheet);

to access objects by means of standard XML/DOM (Extended Markup Language/Document Object Management) applications;

to discover these objects by means of conventional tools of the Web and to reference them in directories of the Web;

to integrate these objects with a source code of the JavaScript type;

to name these objects by means of a URI computer address which is conventional on the Web; and to code these objects according to the conventional methods of the Web.

Figure 9:
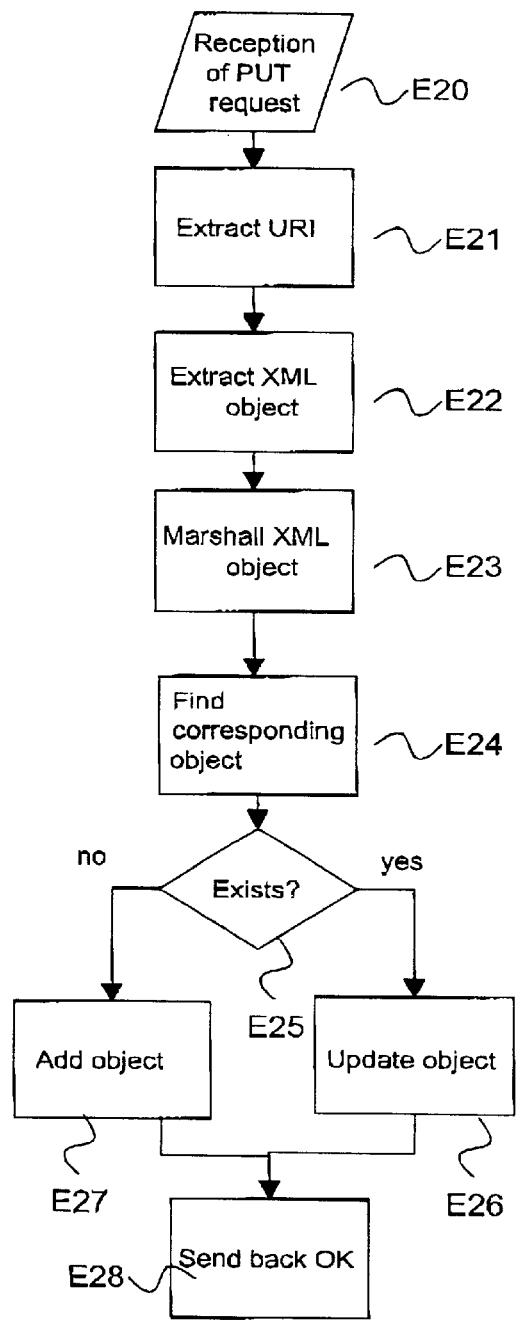
FIG. 9 is an algorithm illustrating a method for the remote updating of a data object according to a third aspect of the invention.

According to a third aspect of the invention, a method of remote updating of data objects on a site can also be implemented in accordance with the example embodiment illustrated in FIG. 9.

For this purpose, a computer request to update is sent from a computer, for example to all the computers in the network. Such a request can be a general request, referred to as a "broadcast request".

It is also possible to store the data objects which have been sent to other sites, in association with the address of these sites, and to send the request to update only to the sites concerned.

This request to update can also be written in a format in accordance with the HTTP communication protocol on the Internet, and can contain in particular fields for including a computer address of an object to be updated, as well as the object itself marshalled to an XML language.

An example of a request to update PUT is illustrated below, making it possible to create an object "Person", accessible at the address http://oceania/web-obj/obj/person2.xml, assuming that the request is sent to a computer called "oceania".

```
PUT /web-obj/obj/person2.xml HTTP/1.1
...
<objects>
    <object>
        <interface
            name="Person"
            href="http://oceania/web-obj/class/Person.xml"/>
        <int name="age" value="33"/>
        <float name="size" value="1.82"/>
        <object-ref
            name="spouse"
            href="http://tasmania/web-obj/obj/person1.xml"/>
    </object>
</objects>
```

This request to update PUT also makes it possible to modify existing objects at a distance.

```
PUT /web-obj/obj/person2.xml HTTP/1.1
...
<objects>
    <object>
        <interface
            name="Employee"
            href="http://oceania/web-obj/class/Employee.xml"/>
        <int name="age" value="33"/>
        <string name="email">moreau@crf.canon.fr</string>
        <string name="phone">00.100.200.300</string>
    </object>
</objects>
```

The data object itself can be sent in a deferred manner, at the request of the network computers concerned.

Each distant computer then first of all implements a step E20 of receiving the computer request to update.

An extraction step E21 then makes it possible to extract the computer address of this computer request, for example URI3.

An extraction step E22 makes it possible in parallel to extract from this same computer request the data object O3 marshalled in the XML communication language, which is to be updated.

Preferably, although this is not necessary, a step E23 of marshalling this data object O3 makes it possible to unmarshall the data object O3 in a programming language used by the data processing application used on the distant site.

Naturally, this marshalling step E23 could be deferred in time until the data processing application of the distant site needs this object O3.

An identification step E24 makes it possible to check whether the extracted computer address URI3 is present in the table of associations T of the distant site.

At the end of the test step E25, in the affirmative, the extracted data object O3 is substituted for the prior data object stored in association with the extracted computer address URI3 in the table of associations T.

Preferably, at this update step E26, the object itself is not directly substituted, but the data fields of the extracted data object O3 are copied to the prior data object stored in the table of associations T of the site This precaution makes it possible to keep unchanged the links, or pointers, directed to this updated object O3.

On the other hand, if at the test step E25 no object corresponding to the extracted computer address URI3 has been found in the table of associations T, an addition step E27 is implemented so as to add this new association of the extracted data object and the extracted computer address to the table of associations T of the site.

Thus it is possible to increase at a distance the table of associations T of a site in the network.

In all cases, this remote updating method consists of associating, in the table of associations T of the distant site, a computer address and a data object extracted from the request to update.

If necessary a response step E28 can be addressed to the computer which sent the update request in order to attest that this updating has indeed been carried out.

Means of receiving a request, extracting an address and an object, associating this address and object in the table T by substitution or addition, and marshalling this object, are incorporated in the microprocessor 500 of the computer C1. The read only memory 501 stores the program instructions adapted to implement the updating method and the random access memory stores the updated table of associations T.

Likewise, a request to delete a data object in a table of associations T could also be sent over the communication network, in order to delete some data objects from the network.

In this case, a delete request including the computer address of the object to be deleted is addressed to all the sites in the network or to the sites concerned.

An example of a request DELETE to delete an object is given below:

The object to be deleted in this example is situated at the address http://oceania/web-obj/obj/person2.xml, assuming that the request DELETE is addressed to the computer called "oceania".

DELETE /web-obj/obj/person2.xml HTTP/1.1

The object is no longer accessible from the previous URI address but does, however, remain in memory, usable by the data processing application of the computer. In addition, the object could also be still accessible via another computer address.

Figure 10:
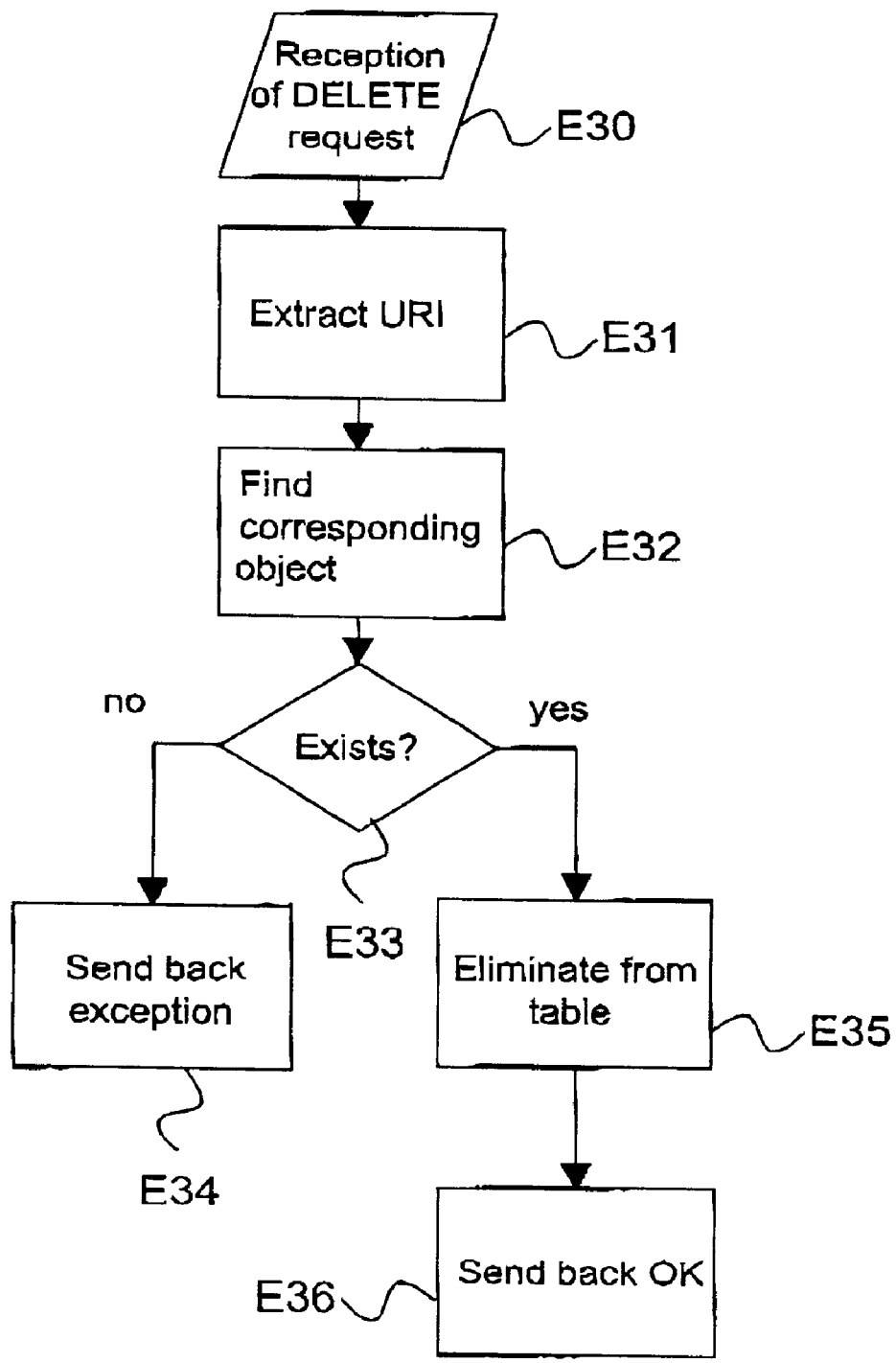
FIG. 10 is an algorithm illustrating a method of eliminating a data object.

On reception E30 of this elimination request, as illustrated in FIG. 10, the association of this computer address and the data object, if it exists, is eliminated from the table of associations T.

In practice, an extraction step E31 extracts the URI computer address of the data object to be eliminated.

An identification step E32 is implemented to seek this URI address in the table T.

At the end of the test step E33, if the extracted URI address has not been identified, an exception is sent in a response step E34.

On the other hand, if the extracted address has been identified, the association of this address and the data object which is associated with it is deleted from the table T in an elimination step E35.

A response of the type "OK" can be sent in a final step E36 in order to indicate that the required elimination has been carried out correctly.

By virtue of the communication language described previously, and the marshalling of a data object, it becomes possible also to execute at a distance, on a computer communication network 4, a function on this data object.

In general terms, a transfer step according to the communication protocol defined by the communication network 4 transfers the function associated with an execution code of this function.

The execution code can, as described previously, be either the source code or a bytecode or a compiled code.

In addition to the execution code, during this transfer step, the function is associated with the parameters necessary for its execution, which are also marshalled to the communication language which can be used by the communication protocol of the network 4.

When it is wished to execute at a distance a function on a data object from its interface, the transfer step transfers all the interface of this object, comprising one or even more functions associated respectively with the execution code of these functions.

A description will now be given of two practical embodiments of the invention, with reference to FIGS. 12 to 15.

In order to facilitate this description, and in no way limitatively, it is considered in the remainder of the description that the computer C1 in the network R1 is a local computer, and the computer C3 in the network R2, connected to the computer C1 via the Internet 4, is a distant computer.

Naturally all the computers in the communication network 4 can in turn be local or distant computers.

A description will be given first of all, with reference to FIGS. 12 and 13, of a method which makes it possible to activate, on the local computer C1, a function on a distant data object, for example the data object O2 created by the distant computer C3, on the computer communication network 4.

As illustrated in FIG. 12, this activation method includes first of all a step E40 of receiving on the local computer C1 a copy of the distant data object O2, marshalled in an XML communication language which can be used by the communication protocol of the communication network 4.

This reception of a distant data object O2 is effected for example using a transfer computer request, such as a transfer request GET described previously, and the transfer method as illustrated in FIG. 8.

On reception of the object O2 on the local computer C1, a step E41 of extracting from this data object a computer address URI' referencing an interface of the object is implemented.

Naturally the object O2 can include several interfaces each referenced by a computer address on the communication network.

A step E42 of sending to the distant computer C3 a get request GET for this interface is implemented, the request GET interface including the extracted computer address, for example the computer address URI1'.

A method of transferring the interface on the computer communication network 4, in response to this get request sent, is then implemented on the distant computer C3.

As illustrated in FIG. 13, this transfer method includes first of all a step E51 of receiving a request GET interface.

Then an extraction step E52 extracts this get request, the computer address URI1' referencing the interface requested.

An identification step E53 is then implemented in order to find the interface in the table of associations T of the interfaces.

Here, by way of example, the reading of the interface table of associations T' makes it possible find the interface I1 in association with the computer address URI1'.

A test step E54 checks that such an interface I1 has indeed been found.

In the negative, a response is sent in a step E55 by sending an exception indicating the error.

On the other hand, when the interface I1 has been identified, a marshalling step E56 is implemented if necessary in order to marshall this interface to the XML language.

This marshalling step E56 is obviously implemented only if the interface I1 stored in the table of associations T' is in a programming language and not already marshalled.

A step E57 of transferring this interface marshalled to the XML communication language is then implemented in order to send the interface to the local computer C1.

This marshalled interface comprises, as described previously with reference to the XML communication language, one or more functions associated respectively with the execution code of these functions.

A step E43 of receiving the result of the request GET interface is then performed on the local computer C1.

An extraction step E44 then extracts the interface I1 comprising one or more functions associated respectively with their execution code.

Preferably, in this embodiment, steps E45 to E50 make it possible to create a class in the programming language used by the data processing application of the local computer C1.

This class comprises the functions of the received interface I1 and the execution code of these functions directly executable thus by the data processing application of the local computer C1.

For this purpose, a corresponding class is created in a creation step E45 and a first function of the interface is selected at the selection step E46.

A test step E47 checks whether or not there exist unprocessed functions in this interface. If functions remain, a step E48 obtains the name and execution code of the function and an addition step E49 enters this code in the corresponding class.

A following function of the interface I1 is next considered in a step E50 and steps E47 to E49 are performed iteratively in order to add the code of each of the functions in the corresponding class.

When all the functions have been processed, it is possible to execute a function directly on the copied data object O2 on the local computer C1 from codes recorded in the class By virtue of the invention, in this embodiment, it is possible to activate a function on the copy of a distant object O2, directly on a local computer C1.

It will be understood that, in this embodiment, the distance execution device according to the invention and the distance execution method implemented by this device are incorporated in the distant computer C3.

More precisely, means of receiving a get request, means of extracting a computer address, means of identifying an interface and means of transferring this interface are incorporated in a microprocessor 500 of the computer C3, the read only memory 501 being adapted to store a program for transferring an interface of a data object on the computer communication network, and a random access memory 502 comprising registers adapted to store variables modified during the running of the program, and in particular storing the table of associations T' as illustrated in FIG. 8.

In a similar manner, a device for activating, on the local computer C1, a function of a distant data object O2 has means of receiving a copy of this data object O2, means of extracting a computer address associated with the interface of this object, means of sending a request to get this interface, means of receiving this interface and means of creating a class in a programming language used by the local computer C1.

These means of the activation device are incorporated in the microprocessor 500 of the local computer C1, a read only memory being adapted to store a program for activating, on this local computer C1, a function of a distant data object O2, and a random access memory being adapted to store in registers the variables modified during the running of this program.

A description will now be given, with reference to FIGS. 14 and 15, of a second embodiment of the invention, which makes it possible to activate on a computer communication network a function of a data object O2 stored on a distant computer C3.

Figure 14:
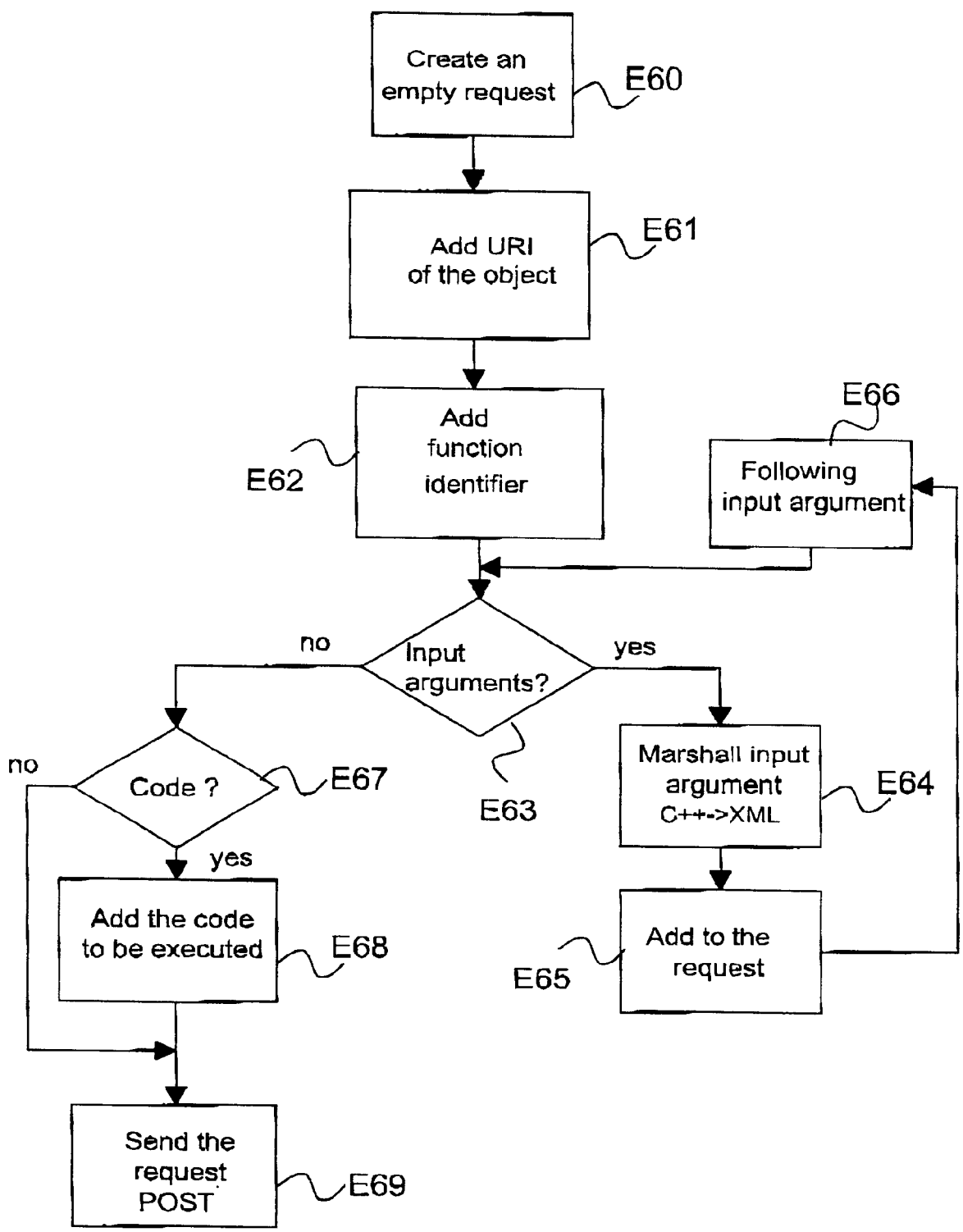
FIG. 14 is an algorithm illustrating a method of producing an activation computer request according to a seventh aspect of the invention.

In this embodiment, a method of producing a computer request is implemented on the local computer C1 as illustrated in FIG. 14.

An initialisation step E60 creates an empty invocation request POST, in order to invoke remotely a function.

A recording step E61 is then performed in order to record the computer address referencing the distant data object O2.

In this example, the computer address of the distant object O2 is the URI1.

A recording step E62 next adds, in this request POST, an identifier for the invoked function.

Typically this function can be identified by its name

Preferably, in this embodiment, a test step E63 checks whether input arguments are necessary for executing this function.

In the affirmative, a marshalling step E64 is performed in order to marshall these input arguments from the programming language, here C++, to an XML communication language, according to the marshalling method described previously.

A step E65 adds these input arguments to the invocation request POST.

Next, in a step E66, the following input argument associated with the function is considered and steps E63 to E66 are reiterated on all the input arguments.

When all the input arguments of the function have been processed and added to the invocation request POST, a test step E67 checks whether an execution code is associated with this function.

In the affirmative, an addition step E68 associates this execution code with the function in the invocation request POST.

This request POST is next sent in a transfer step E69 to the distant computer C3.

An example of an invocation request POST for a distance function is given below. The address to which the request POST is sent should be that of the object to which the function applies.

```
POST /web-obj/obj/calculator1.xml HTTP/1.1
...
<functions>
    <function name="square" type="int">
        <arguments>
            <int value="5"/>
        </arguments>
        <code
            language: "Java Script"
            type: "source"
            href: http://oceania/web-obj/code/integer/square.js>
        ...
        </code>
    </function>
</functions>
```

Figure 15:
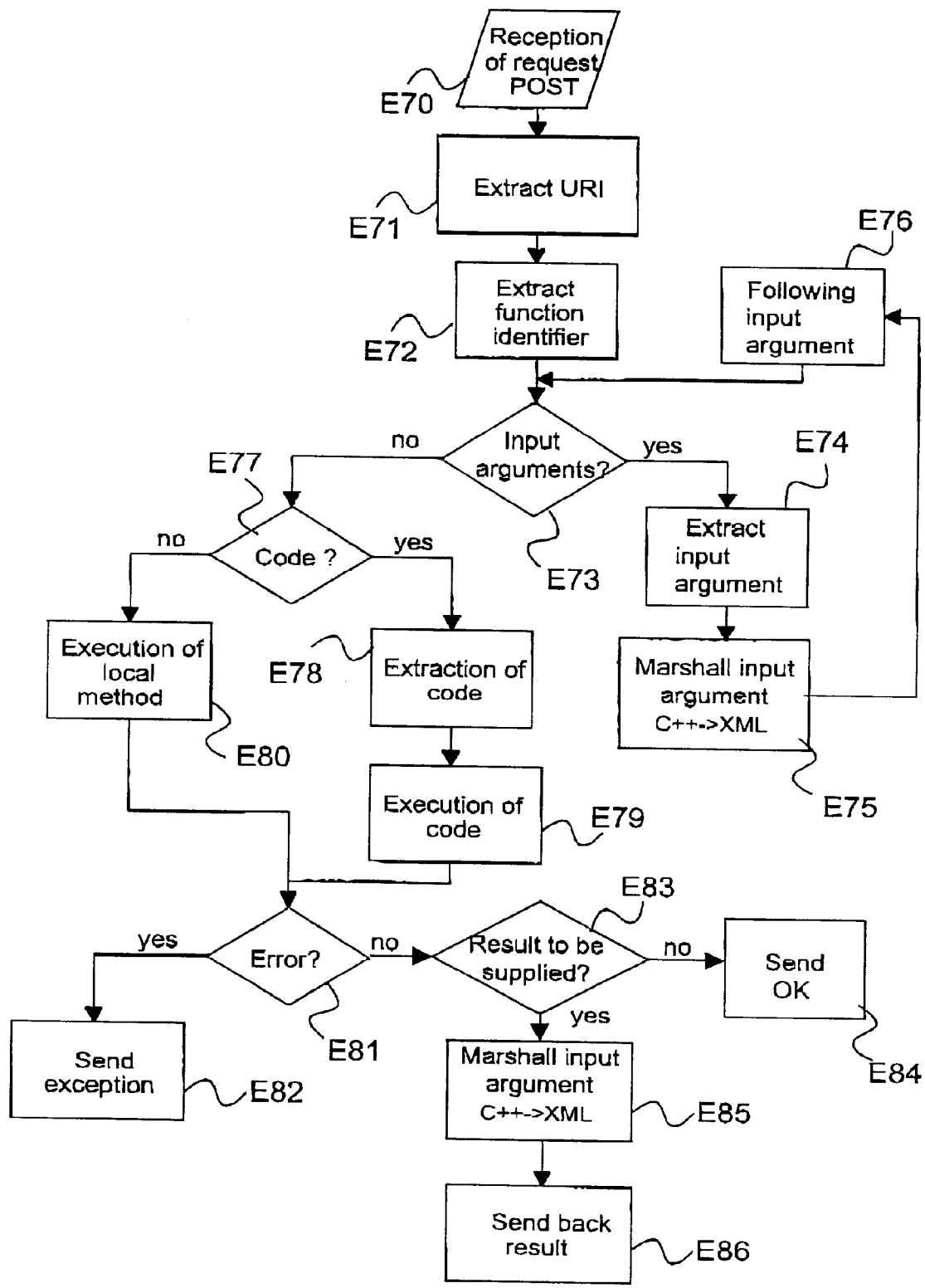
FIG. 15 is an algorithm illustrating a method of activating a function on a distant computer according to an eighth aspect of the invention.

As illustrated in FIG. 15, the method of activating the function on the data object O2 is then implemented on the distant computer C3.

A reception step E70 makes it possible to receive the invocation request POST produced as described previously.

An extraction step E71 is then performed in order to extract the computer address referencing the data object O2 on which the function is invoked.

An extraction step E72 is also performed in order to extract from the request the identifier of the function.

Preferably a test step E73 checks whether input arguments are necessary for executing this function. In the affirmative, a step E74 of extracting these input arguments is performed, and then a reverse marshalling step E75 marshals all these input arguments from the XML communication language to a programming language such as C++.

In a step E76 the following input argument is then considered, and all these input arguments are thus analysed by reiterating steps E73 to E76.

When all the input arguments have been extracted from the request POST and marshalled, a step E77 checks whether an execution code is inserted in the request POST In the affirmative, the activation method includes a step E78 of extracting this execution code associated with the function, and a step E79 of executing this code on the distant data object O2.

Naturally, if no execution code is inserted in the invocation request POST, a step E80 executes the local method available on the distant computer C3.

A test step E81 checks whether the activation of this function has been performed without error.

If an error has occurred, a response is sent in a step E82 to the local computer C1, this response including, in a known manner, an exception in order to indicate the error produced.

If not, a test step E83 checks whether or not the executed function supplies a result.

In the negative, the response addressed to the local computer is sent in a step E84 and includes only the wording "OK".

On the other hand, if a result must be supplied, such as a modified object, a marshalling step E85 is then performed on the data object O2 on which the function was performed, in order to marshall this data object O2 from its programming language C++ to the XML communication language.

A sending step E86 is then implemented in order to send back the result, that is to say the marshalled data object O2, to the local computer C1 which invoked the function at a distance.

In this embodiment, the device for executing at a distance and the associated method, both in accordance with the invention, are incorporated in the local computer C1.

More precisely, the device for producing the computer request POST comprising means of recording a computer address, means of recording an identifier of the function to be invoked and means of adding the execution code associated with this function, is incorporated in the microprocessor 500 of the local computer C1, the read only memory 501 being adapted to store the program for producing such a POST computer request, and the random access memory 502 comprising registers adapted to store variables modified during the running of this program.

In a similar manner, an activation device according to the invention is incorporated in the distant computer C3.

It has means of receiving an activation request POST, means of extracting the computer address referencing the distant computer object, means of extracting the identifier of the function to be invoked, means of extracting the execution code of this function and means of executing this code, incorporated in the microprocessor 500 of the computer C3

The read only memory 501 of this computer C3 is adapted to store a program adapted to implement the activation method on the computer communication network and the random access memory 502 comprising registers adapted to store variables modified during the running of this program.

Thus, by virtue of the invention, the data objects created by each data processing application on the different sites of a communication network can be shared easily by the different sites connected to this network.

As soon as this object has been published, or made visible, by virtue of its unique URI computer address, the other applications in the network can access this object through its representation in a communication language common to the network, using this computer address.

In particular, the functions associated with these objects can be invoked at a distance on this communication network, in order in particular to avoid any unnecessary transfer over the communication network proper.

What is claimed is:

1. A method of transferring a data object on a computer communication network, comprising the steps of:
    receiving a computer request for a transfer;
    extracting a computer address from the computer request;
    identifying a data object associated with the computer address;
    marshalling the identified data object to a communication language that conforms with a communication protocol of the computer communication network; and
    transferring the marshalled data object.

2. A method according to claim 1, wherein the identified data object associated with the computer address is stored in a table of associations.

3. A method according to claim 2, wherein the table of associations is updated each time a computer request for an update is received.

4. A method according to claim 3, further comprising the step of marshalling a data object extracted from the computer request for an update to a programming language used by a computer application of a site in the computer communication network.

5. A method according to claim 4, further comprising the steps of:
    identifying whether the extracted computer address exists in the table of associations, which corresponds to the site; and
    if affirmative, substituting the extracted data object for a prior data object stored in association with the extracted computer address in the table of associations.

6. A method according to claim 5, wherein, in the step of substituting, data fields of the extracted data object are copied to the prior data object stored in the table of associations of the site.

7. A method according to claim 4, further comprising the steps of:
 identifying whether the extracted computer address exists in the table of associations, which corresponds to the site; and
 if negative, adding an association of the extracted data object and the extracted computer address to the table of associations of the site.

8. A method according to claim 1, wherein the marshalling step includes:
 reading a data field included in the data object;
 substituting, for the data field, a computer address associated with the data field when a structure of the data field is complex; and
 storing the computer address associated with the data field in a table of associations.

9. A method according to claim 8, wherein, in the step of storing, the data field is stored in the communication language.

10. A method according to claim 8, wherein a complex structure of the data field may be at least one data object, an array, or a chain of characters of minimum length.

11. A method according to claim 8, further comprising the step of comparing the structure of the data field with a pre-established list of complex data structures.

12. A storage medium storing a computer-readable program of software codes for implementing a method according to one of claims 1–7.

13. A method of transferring an interface on a computer communication network in response to a get request, comprising the step of:
 receiving a get request;
 extracting a computer address referencing an interface;
 identifying the interface in a table of associations, which stores electronic addresses in association with interfaces; and
 transferring the interface marshalled to a communication language that conforms with a communication protocol of the computer communication network, wherein the interface is comprised of one or more functions and respective execution codes associated with the one of more functions.

14. A storage medium storing a computer-readable program of software codes for implementing a method according to claim 13.

15. An apparatus for transferring a data object on a computer communication network, comprising:
 means for receiving a computer request for a transfer;
 means for extracting a computer address from the computer request;
 means for identifying a data object associated with the computer address;
 means for marshalling the identified data object to a communication language that conforms with a communication protocol of the computer communication network; and
 means for transferring the marshalled data object.

16. An apparatus according to claim 15, wherein the identified data object associated with the computer address is stored in a table of associations.

17. An apparatus according to claim 16, wherein the table of associations is updated each time a computer request for an update is received.

18. An apparatus according to claim 17, further comprising means for marshalling a data object extracted from the computer request for an update to a programming language used by a computer application of a site in the computer communication network.

19. An apparatus according to claim 18, further comprising:
 means for identifying whether the extracted computer address exists in the table of associations, which corresponds to the site; and
 means for, if affirmative, substituting the extracted data object for a prior data object stored in association with the extracted computer address in the table of associations.

20. An apparatus according to claim 19, wherein the means for substituting copies data fields of the extracted data object to the prior data object stored in the table of associations of the site.

21. An apparatus according to claim 18, further comprising:
 means for identifying whether the extracted computer address exists in the table of associations, which corresponds to the site; and
 means for, if negative, adding an association of the extracted data object and the extracted computer address to the table of associations of the site.

22. An apparatus according to claim 15, wherein the means for marshalling includes:
 means for reading a data field included in the data object;
 means for substituting, for the data field, a computer address associated with the data field when a structure of the data field is complex; and
 means for storing the computer address associated with the data field in a table of associations.

23. An apparatus according to claim 22, wherein the means for storing stores the data field in the communication language.

24. An apparatus according to claim 22, wherein a complex structure of the data field may be at least one data object, an array, or a chain of characters of minimum length.

25. An apparatus according to claim 22, further comprising means for comparing the structure of the data field with a pre-established list of complex data structures.

26. An apparatus for transferring an interface on a computer communication network in response to a get request, comprising:
 means for receiving a get request;
 means for extracting a computer address referencing an interface;
 means for identifying the interface in a table of associations, which stores electronic addresses in association with interfaces; and
 means for transferring the interface marshalled to a communication language that conforms with a communication protocol of the computer communication network, wherein the interface is comprised of one or more functions and respective execution codes associated with the one of more functions.

* * * * *

UNITED STATES PATENT AND TRADEMARK OFFICE
CERTIFICATE OF CORRECTION

PATENT NO. : 6,766,350 B1
DATED : July 20, 2004
INVENTOR(S) : Jean-Jacques Moreau It is certified that error appears in the above-identified patent and that said Letters Patent is hereby corrected as shown below:

Column 30,
Line 64, "of" should read -- or --.

Signed and Sealed this

Twenty-sixth Day of October, 2004

JON W. DUDAS
*Director of the United States Patent and Trademark Office*